(12) United States Patent
Lee et al.

(10) Patent No.: US 8,499,158 B2
(45) Date of Patent: Jul. 30, 2013

(54) ANONYMOUS AUTHENTICATION SERVICE METHOD FOR PROVIDING LOCAL LINKABILITY

(75) Inventors: Sok Joon Lee, Daejeon (KR); Jung Yeon Hwang, Gyeonggi-do (KR); Yun Kyung Lee, Daejeon (KR); Sin Hyo Kim, Daejeon (KR); Sang Woo Lee, Daejeon (KR); Hye Ran Moon, Daejeon (KR); Young Ho Kim, Daejeon (KR); Byung Ho Chung, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 276 days.

(21) Appl. No.: 12/971,103

(22) Filed: Dec. 17, 2010

(65) Prior Publication Data

US 2011/0154045 A1    Jun. 23, 2011

(30) Foreign Application Priority Data

Dec. 18, 2009   (KR) ........................ 10-2009-0127545
Oct. 26, 2010   (KR) ........................ 10-2010-0104585

(51) Int. Cl.
        *H04L 9/32*        (2006.01)
(52) U.S. Cl.
        USPC ........................................ 713/176; 713/180
(58) Field of Classification Search
        USPC ................................. 713/168–180
        See application file for complete search history.

(56) References Cited

U.S. PATENT DOCUMENTS

| | | | | |
|---|---|---|---|---|
| 8,245,047 | B2 * | 8/2012 | Zaccone et al. | 713/180 |
| 8,281,149 | B2 * | 10/2012 | Laurie et al. | 713/185 |
| 8,356,181 | B2 * | 1/2013 | Brickell et al. | 713/180 |
| 2008/0152130 | A1 | 6/2008 | Teranishi | |
| 2009/0074188 | A1 * | 3/2009 | Furukawa | 380/277 |
| 2009/0285386 | A1 * | 11/2009 | Takashima | 380/28 |
| 2010/0174911 | A1 * | 7/2010 | Isshiki | 713/182 |

FOREIGN PATENT DOCUMENTS

JP    2008-131058    6/2008
KR    10-2006-0003601    1/2006

OTHER PUBLICATIONS

Boneh et al., Short Group Signatures, Stanford University, 2004, pp. 41-55.*
Dan Boneh et al., "Short Group Signatures", CRYPTO 2004, LNCS 3152, pp. 41-55, 2004.

* cited by examiner

*Primary Examiner* — Jeffrey Pwu
*Assistant Examiner* — Jayesh Jhaveri
(74) *Attorney, Agent, or Firm* — Staas & Halsey LLP (57) ABSTRACT

There is provided an anonymous service method of providing local linkability. The anonymous service method providing local linkability according to exemplary embodiments of the invention, an anonymous authentication operation based on a short group signature is performed, for which the concept of a local linkability is introduced to secure linkability within the same service domain. Namely, in the interior of a service provider, a virtual index having a fixed value is calculated for each service user, and in this case, although a plurality of service providers collude with each other, they cannot calculate a virtual index having the same value, whereby the linkability can be secured within the same service domain but not within the interiors of different service domains.

16 Claims, 7 Drawing Sheets

ANONYMOUS AUTHENTICATION SERVICE METHOD FOR PROVIDING LOCAL LINKABILITY

CROSS-REFERENCE TO RELATED APPLICATIONS

This application claims the priority of Korean Patent Application Nos. 10-2009-0127545 filed on Dec. 18, 2009 and 10-2010-0104585 filed on Oct. 26, 2010, in the Korean Intellectual Property Office, the disclosures of which are incorporated herein by reference.

BACKGROUND OF THE INVENTION

1. Field of the Invention

The present invention relates to an anonymous authentication service method of providing local linkability capable of supporting linkability within the same service domain while maintaining anonymity by altering a representative short group signature, among anonymous authentication schemes.

2. Description of the Related Art

In general, a person may be requested to verify his personal identity or his electronic signature for important transactions such as financial transactions, or the like, on the Internet, or may use electronic certificates based on a PKI (Public Key Infrastructure) to verify his identity and authentication to use a particular service.

The PKI-based electronic certificates allows only a person who retains a secret key to generate an electronic signature, and because the probability that a person who does not have the secret key may forge the electronic signature is as low as to be negligible, the PKI-based electronic certificates enables very safe and convenient electronic signature and authentication.

However, certificates issued by an accredited certification body expose the real name of a user and include information for cryptologically ascertaining whether or not important personal information such as whether a resident registration number (or a social security number) is identical, or the like, providing information regarding who has generated particular electronic signature information, causing a problem with privacy.

Meanwhile, some services do not require users' personal identity verification, and simply checking whether or not the user is eligible to use a service (or whether or not the user is an adult) may be sufficient. To this end, anonymous authentication schemes have been studied, and a short group signature is a typical method therefor. Group signature schemes including a short group signature include basic functions for anonymity available for conditional tracing such as anonymity, traceability, unlinkability, and the like.

Among them, unlinkability means that even in the case that anonymous users perform anonymous authentications several times, a verifier (largely, a service providing server) cannot determine whether or not they are the same users. If the unlinkability function is not provided, every service usage pattern and the usage records of a particular user can be tracked. As the tracking records are accumulated, the user's anonymity becomes highly likely to be compromised, and when the real name of any one of the records is exposed, the overall anonymity is broken.

However, unlinkability may be very inconvenient when applied to a general Internet service.

In general, a service provider compiles statistics related to a service usage, works out a strategy, classifies a regular service user and a bad (undesirable or malicious) service user, and provides diverse services such as providing a specified service or restricting the use of services, and the like. However, information regarding service users based on the anonymous authentication scheme cannot be obtained, making it difficult to establish a service plan and strategy.

Thus, a novel anonymous service method that may satisfy such requirements although it slightly sacrifices the users' privacy is required.

SUMMARY OF THE INVENTION

An aspect of the present invention proposes a novel concept of local linkability having common ground between unlinkability and linkability and provides an anonymous service method capable of allowing for the managing of anonymous members, requisite for providing services, while guaranteeing a proper level of anonymity, by using local linkability.

According to an aspect of the present invention, there is provided an anonymous service method of providing local linkability, including: a service user joining step of acquiring, by a service terminal, a group signature secret key of a service user in cooperation with an anonymous authentication server; a service providing server joining step of acquiring, by a service providing server, a pair of a partial linkage public key and a secret key of a service provider in cooperation with an anonymous ID checking server; a group signature generating step of receiving, by the service terminal, the public key from the service providing server, and generating a group signature of the service user based on the public key and the group signature secret key; a group signature verifying step of verifying, by the service providing server, whether or not the group signature is valid; a signer checking step of calculating, by the anonymous ID checking server, an anonymous ID from the group signature, and checking the service user having the anonymous ID in cooperation with the anonymous authentication server; and a local linking step of checking, by the service providing server, whether or not the group signature is proper through the public key and acquiring a virtual index of the service user from the group signature through the secret key in order to secure a local linkability of the service user.

The method may further include: a group generating step of generating, by the anonymous authentication server, a group public key and a group member key generation secret key with a group public parameter, and releasing (i.e., revealing or making public) the group public parameter and the group public key, before the service user joining step.

The group generating step may include: determining a bilinear group and function and a hash function as the group public parameter; and releasing the group public key based on the group public parameter, and generating and storing the group member key generation secret key.

The service user joining step may include: generating, by the service terminal, a secret key of the service user and providing information regarding POP (Proof of Possession) of a private key and identification information regarding the secret key to the anonymous authentication server; generating, by the anonymous authentication server, the group member key including an anonymous ID corresponding to the service user and providing the same to the service terminal, and registering the service user; and generating, by the service terminal, the group signature secret key by combining the secret key and the group member key, and storing the generated group signature secret key.

The group member key may be represented as $(A_i, x_i, z_i)$ $(A_i = (g_1 g_4^{-z_i} g_3^{-y_i})^{1/(\gamma + x_i)} \in G_1, x_i, y_i, z_i \in Z_p^*$, $G_1, G_2$ is a bilinear group, $g_1 = \phi(g_2)$, $g_2 \in G_2 \setminus \{1_{G_2}\}$, $\phi$ is an isomorphism function, $g_3, g_4 \in G_1 \setminus \{1_{G_1}\}$, $\gamma \in Z_p^*$), and the group signature secret key may be represented as $gsk[i] = (A_i, x_i, z_i, y_i)$, the information regarding POP (Proof of Possession) of a private key may be generated by using $g_3 \in G_1$ and the secret key $y_i$, which is information including $g_3^{-y_i}$ as verification information indicating that it possesses the secret key $y_i$.

The step of generating the group member key and providing the generated group member key to the service user may include: when the service user has already been registered, updating the group member key corresponding to the service user with the latest information and providing the same to the anonymous authentication server; and when the service user has not been registered, generating, by the anonymous authentication server, the group member key corresponding to the service user and providing the generated group member key to the service terminal, and registering the service user.

The service providing server joining step may include: providing, by the service providing server, identification information of the service provider to the anonymous ID checking server; generating, by the anonymous ID checking server, the pair of a public key and a secret key and a tracking key to register the service provider, and providing the pair of a public key and a secret key to the service providing server; and generating, by the service providing server, an LL public key and an LL secret key from the pair of public key and secret key, and storing the same.

The public key may be represented as $LLpk_{SP}[j]=(h_j, m_j, u_j, v_j)(h_j=m_j^{\chi_j}, u_j=m_j^{\xi_{1j}^{-1}}, v_j=m_j^{\xi_{2j}^{-1}} \in G_1, m_j \in G_1, m_j \in G \setminus \{1_{G_1}\}, \chi_j, \xi_{1j}, \xi_{2j} \in Z^*_p)$, the secret key may be represented as $LLsk_{SP}[j]=(M_j, U_j, V_j)(M_j \in G_2 \setminus \{1_{G_1}\}, U_j=H_j^{\xi_{1j}}, V_j^{\xi_{2j}} \in G_2)$, and the tracking key may be represented as $(tk_{SP}[j]=(\xi_{1j}, \xi_{2j}, \chi_j))(\chi_j, \xi_{1j}, \xi_{2j} \in Z^*_p)$.

The generating and storing of the LL public key and the LL secret key may include: generating, by the service providing server, the LL public key from the public key by using a group public parameter of a current session, and storing the same; and storing, by the service providing server, the secret key as the LL secret key.

The group public parameter may be represented as $(e, G_1, G_2, H)$ ($H:\{0,1\}^* \rightarrow Z_P$, H is a hash function), the group public key may be represented as $(gpk=(g_0, g_1, g_2, g_3, g_4, w))$, and the LL public key may be represented as $(LLpk_{SP}[j]=(h_j, m_j, u_j, v_j))$.

The generating and storing of the LL public key and the LL secret key may further include, before generating and storing the LL public key and storing the secret key as the LL secret key: checking, by the service providing server, whether or not the pair of public key and the secret key satisfies a formula of $e(m_j, M_j)=e(u_j, U_j)=e(v_j, V_j)$.

The group signature generating step may include: acquiring, by the service terminal, the LL public key of the service provider from the service providing server; and generating, by the service terminal, the group signature by using the LL public key, the group signature secret key, and a message.

The group signature may be represented as $(\sigma=(T_1, T_2, T_3, T_4, c, s_\alpha, s_\beta, s_{x_i}, s_{y_i}, s_{z_i}, s_{\delta_1}, s_{\delta_2}))(T_1=u_j^\alpha, T_2=v_j^\beta, T_3=A_{ij}^{\alpha+\beta}, T_4=g_0^{-z_i}m_j^{\alpha-\beta}, \alpha, \beta \in Z_p, H:\{0,1\}^* \rightarrow Z_p$, H is a hash function, $c=H(M, T_1, T_2, T_3, T_4, R_1, R_2, R_3, R_4, R_5, R_6)$, M is a message, $R_1 \leftarrow u_j^{r_\alpha}, R_2 \leftarrow v_j^{r_\beta}$, $$R_3 \leftarrow e(T_3, g_2)^{r_{x_i}} \cdot e(h_j, w)^{-r_\alpha - r_\beta} \cdot$$
$$e(h_j, g_2)^{-r_{\delta_1}-r_{\delta_2}} \cdot e(g_3, g_2)^{r_{y_i}} \cdot e(g_4, g_2)^{r_{z_i}},$$
$$R_4 \leftarrow g_0^{r_{z_i}} \cdot m_j^{-r_\alpha + r_\beta},$$
$$R_5 \leftarrow T_1^{r_{x_i}} u_j^{-r_{\delta_1}},$$
$$R_6 \leftarrow T_2^{r_{x_i}} v_j^{-r_{\delta_2}},$$

$h_j=h_j^{\chi_j}, m_j \in G_1 \setminus \{1_{G_1}\}, \chi_j \in Z_p^*, w=g_2^\gamma \in G_2, \gamma \in Z_p^*, \delta_1 = x_i\alpha, \delta_2=x_i\beta, s_\alpha=r_\alpha+c\alpha, s_\beta=r_\beta+c\beta, s_{x_i}=r_{x_i}+cx_i, s_{y_i}=r_{y_i}cy_i, s_{z_i}=r_{z_i}+cz_i, s_{\delta_1}=r_{\delta_1}+c\delta_1, s_{\delta_2}=r_{\delta_2}+c\delta_2)$.

The signer checking step may include: extracting, by the anonymous ID checking server, an anonymous ID of the service user from the group signature by using the tracking key; and checking, by the anonymous ID checking server, a service user having the identification information corresponding to the extracted anonymous ID and the group member key in cooperation with the anonymous authentication server.

The anonymous ID may be represented as $(B_i=g_0^{-z_i}=\tilde{T}_4 \cdot (\tilde{T}_1^{-\xi_{1j}} \tilde{T}_2^{\xi_{2j}}))(T_4 \leftarrow g_0^{-z_i} m_j^{\alpha-\beta}, T_1 \leftarrow u_j^\alpha, T_2 \leftarrow v_j^\beta)$.

The local linking step may include: checking, by the service providing server, whether or not the group signature is proper; and acquiring a virtual index of the service user from the group signature through the LL secret key to secure a local linkability.

The virtual index of the service user may be represented as $(P_{ij} \leftarrow e(\tilde{T}_4, M_j) \cdot e(\tilde{T}_1, V_j)^{-1} \cdot e(\tilde{T}_2, V_j) = e(B_i, M_j) = (g_0^{-z_i}, M_j))$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context in which it is used. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Before explaining an anonymous service method according to an exemplary embodiment of the present invention, a short group signature as a basis of the present invention will be described first.

A group signature scheme was first proposed by D. Chaum et al. at the EUROCRYPT conference in 1991. According to this scheme, any member of a group can write a signature and a verifier is able to verify whether or not the signature is proper but cannot obtain any information regarding the signer. A group manager, the most important entity in the group signature scheme, can track a group signature to recognize the identity of a group signer.

A Short Group Signature is a sort of group signature scheme proposed by D. Boneh et al. in the CRyPTO conference in 2004, having an advantage in that as the signature is fixed and short (1533 bits), the signature and its verification time are relatively short.

Figure 1:
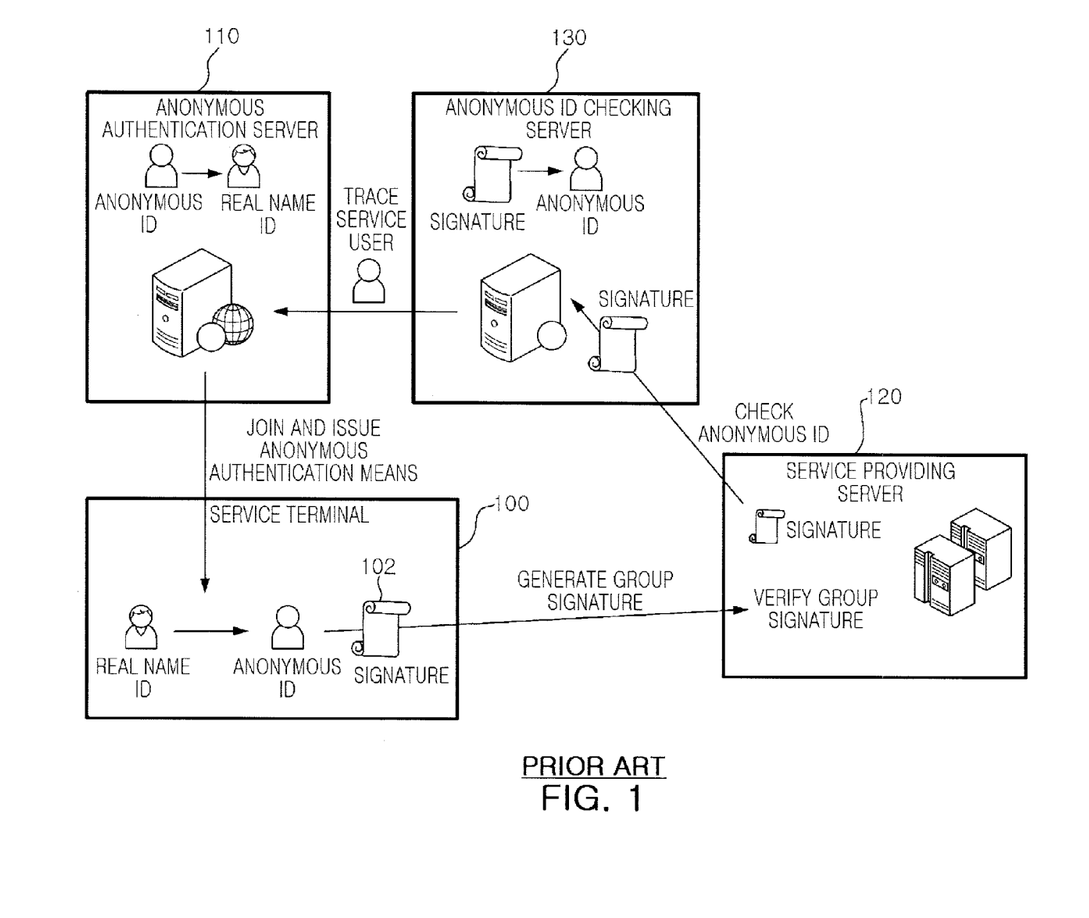
FIG. 1 is a view illustrating an anonymous service system using a general short group signature.

FIG. 1 is a view illustrating an anonymous service system using a general short group signature.

With reference to FIG. 1, the anonymous service system may include a service terminal 100, an anonymous authentication server 110, a service providing server 120, and an anonymous ID checking server 130.

The service terminal 100 is a device for receiving an anonymous authentication means (anonymous ID ∥ secret key) issued from the anonymous authentication server 110 to allow a user to use a service anonymously. The service terminal 100 according to an exemplary embodiment of the present invention is driven and used by a service user, so therefore, hereinafter, the service terminal 100 will be referred to as a service user for the sake of brevity.

The anonymous authentication server 110 checks the real name (e.g., personal identity) of the service user and issues an anonymous authentication means. If there is a problem, the anonymous authentication server 110 may track the real name of the user in concert with the anonymous ID checking server 130, but cannot track it alone.

The service providing server 120 provides a service anonymously, and if there is a problem, the service providing server 120 may request the tracking of the real name of the anonymous user through the anonymous ID checking server 130.

The anonymous ID checking server 130 may receive an anonymous authentication transaction from the service providing server 120 and check the anonymous ID therefrom.

Figure 2:
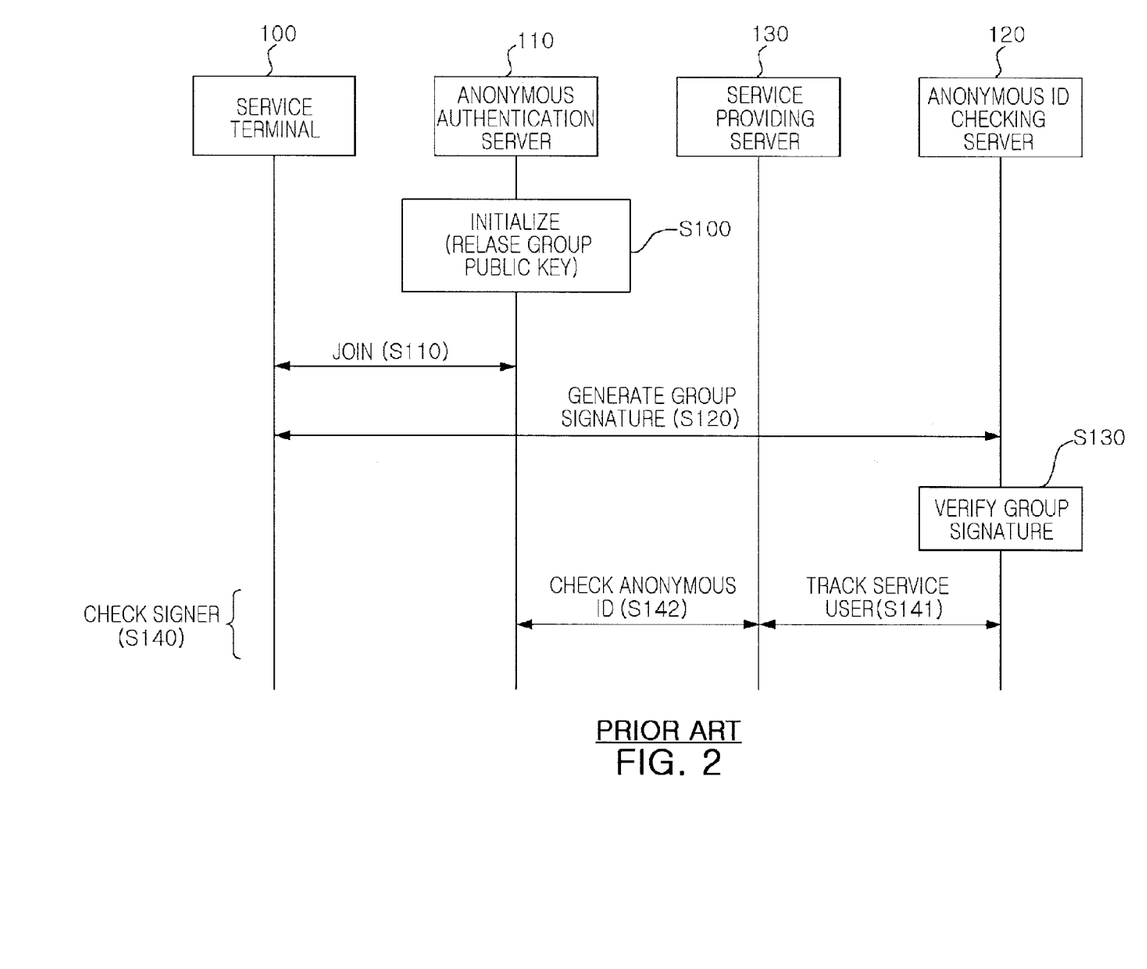
FIG. 2 is a flow chart illustrating the process of an anonymous service method using the general short group signature.

FIG. 2 is a flow chart illustrating the process of an anonymous service method using the general short group signature.

As for the short group signature in FIG. 2, a basic method and an additional method for applying a strong exculpability have been proposed, and hereinafter, the anonymous service method based on the strong exculpability scheme will be described.

The anonymous service method in FIG. 2 includes an initialization (or setup) step (S100), a joining step (S110), a group signature generation step (S120), a group signature verifying step (S130), and a signature checking (opening) step (S140).

First, in the initialization step (S100), the anonymous authentication server 110 and the anonymous ID checking server 130 perform the following processes.

1) The anonymous authentication server 110 receives a security parameter K and generates a calculable isomorphism function $\phi$ coupled with a bilinear group pair ($G_1$, $G_2$), a bilinear function e: $G_1 \times G_2 \rightarrow G_T$, and a hash function H:{0, 1}*$\rightarrow Z_P$. Also, the anonymous authentication server 110 selects certain generation sources $g_2 \square G_2 \backslash \{1_{G_2}\}$ and $g_3 \in G_1 \backslash \{_{G_1}\}$, calculates $g_1 = \phi(g_2)$, selects a master secret key $\gamma \in Z^*_p$, and calculates a group public key element $w = g_2^\gamma \square G_2$ to acquire a group public key gpk=($g_1, g_2, g_3, w$).

2) The anonymous ID checking server 130 selects a certain generation source $h \square G_1 \backslash \{1_{G_1}\}$ and certain random numbers $\xi_1, \xi_2 \in Z_P^*$, and calculates u, $v \square G_1$ satisfying $u^{\xi_1} = v^{\xi_2} = h$. Also, the anonymous ID checking server 130 delivers public parameters (h,u,v) to the anonymous authentication server 110 and stably stores gmtk=($\xi_1, \xi_2$) with a master tracking key.

3) The anonymous authentication server 110 releases the group public key gpk to every participant. In this case, the participants assume that they can verify that the (h,u,v) values included in the group public key gpk have been issued by the anonymous ID checking server 130, and the group public key is updated whenever a revocation event occurs.

Thereafter, in the joining step (S110), the anonymous authentication server 110 and the service user who wants to join the group performs the following process. In this case, it is assumed that a security channel is formed between the anonymous authentication server 110 and the service user 100.

1) The service user 100 selects a secret key $y_i \square Z_P^*$ and calculates a public key $g_3 \in G_1$. The service user 100 then generates a proof of possession (POP) of a private key with respect to the secret key $y_i$, namely, proof information POP ($y_i$) regarding the possession of the secret key $y_i$, and transmits the proof information ($y_i$) together with his identification information to the anonymous authentication server 110. Namely, the service user 100 transmits (identification information, POP ($y_i$)) to the anonymous authentication server 110.

2) When (identification information, POP ($y_i$)) is received from the service user 100, the anonymous authentication server 110 checks whether or not the received (identification information, POP ($y_i$)) is valid. The anonymous authentication server 110 selects a certain random number $x_i \in Z_P^*$, calculates $A_i = (g_1 g_3^{-y_i})^{1/(\gamma+x_i)} \in G_1\}$, transmits a group member key (or a valid SDH (Strong Diffie-Hellman) tuple) $(A_i, X_i)$ to the service user 100, and adds (identification information, $(A_i, X_i)$) to a user list to register the corresponding service user 100.

3) Upon receiving the group member key $(A_i, X_i)$, the service user 100 checks whether or not Equation 1 shown below is established. When Equation 1 is established, the service user 100 combines the received group member key $(A_i, X_i)$ and his secret key $y_i$ to generate a group signature secret key $gsk[i] = (A_i, x_i, y_i)$, and stores the same.

$$e(A_i, w \cdot g_2^{x_i}) = \eta_1 \cdot \eta_4^{-y_i} (= e(g_2 g_3^{-y_i}, g_2)). \quad \text{[Equation 1]}$$

In the group signature generation step (S120), the service user 100 performs an operation as follows.

1) The service user 100 selects certain random numbers $\alpha, \beta \in Z_P$, calculates $T_1 \leftarrow u^\alpha$, $T_2 \leftarrow v^\beta$, $T_3 \leftarrow A_i h^{\alpha+\beta}$, and then calculates $\delta_1 \leftarrow x_i \alpha$ and $\delta_2 \leftarrow x_i \beta$. Also, the service user 100 selects certain random numbers $r_\alpha, r_\beta, r_{x_i}, r_{y_i}, r_{\delta_1}, r_{\delta_2} \in Z_p$, and calculates $R_1, R_2, R_3, R_4, R_5$ according to Equation 2 shown below:

$$R_1 \leftarrow u^{r_\alpha}, \quad \text{[Equation 2]}$$
$$R_2 \leftarrow v^{r_\beta},$$
$$R_3 \leftarrow e(T_3, g_2)^{r_{x_i}} \cdot e(h, w)^{-r_\alpha - r_\beta} \cdot$$
$$e(h, g_2)^{-r_{\delta_1} - r_{\delta_2}} \cdot e(g_3, g_2)^{r_{y_i}},$$
$$R_4 \leftarrow T_1^{r_{x_i}} u^{-r_{\delta_1}},$$
$$R_5 \leftarrow T_2^{r_{x_i}} v^{-r_{\delta_2}}.$$

2) The service user 100 calculates a hash value $c = H(M, T_1, T_2, T_3, R_1, R_2, R_3, R_4, R_5)$ by using $T_1, T_2, T_3, R_1, R_2, R_3, R_4, R_5$ and a message M, and calculates $s_\alpha = r_\alpha + c\alpha$, $s_\beta = r_\beta + c\beta$, $s_{x_i} = r_{x_i} + c x_i$, $s_{y_i} = r_{y_i} + c y_i$, $s_{\delta_1} = r_{\delta_1} + c\delta_1$, $s_{\delta_2} = r_{\delta_2} + c\delta_2$ to output a group signature $\sigma = (T_1, T_2, T_3, c, s_\alpha, s_\beta, s_{x_i}, s_{y_i}, s_{\delta_1}, s_{\delta_2})$ with respect to the message M.

In the group signature verifying step (S130), the service providing server 120 or a certain participant performs the following operation with respect to the group public key gpk, the message M, and the corresponding group signature $\tilde{\sigma} = (\tilde{T}_1, \tilde{T}_2, \tilde{T}_3, \tilde{c}, \tilde{s}_\alpha, \tilde{s}_\beta, \tilde{s}_{x_i}, \tilde{s}_{y_i}, \tilde{s}_{\delta_1}, \tilde{s}_{\delta_2})$.

The service providing server 120 or the certain participant calculates $\tilde{R}_1, \tilde{R}_2, \tilde{R}_3, \tilde{R}_4, \tilde{R}_5$ according to Equation 3 shown below, generates a hash value $H(M, \tilde{T}_1, \tilde{T}_2, \tilde{T}_3, \tilde{R}_1, \tilde{R}_2, \tilde{R}_3, \tilde{R}_4, \tilde{R}_5)$ by using the calculated $\tilde{R}_1, \tilde{R}_2, \tilde{R}_3, \tilde{R}_4, \tilde{R}_5$, a given $\tilde{T}_1, \tilde{T}_2, \tilde{T}_3$, and the message M, and checks whether or not this value is identical to $\tilde{c}$ included in the group signature. When the two values are identical, the service providing server 120 or a certain participant outputs 1 (namely, the signature is value), or otherwise, the service providing server 120 or a certain participant outputs 0 (namely, the signature is not valid).

$$\tilde{R}_1 \leftarrow u^{\tilde{s}_\alpha} \cdot \tilde{T}_1^{-\tilde{c}}, \quad \text{[Equation 3]}$$
$$\tilde{R}_2 \leftarrow v^{\tilde{s}_\beta} \cdot \tilde{T}_2^{-\tilde{c}},$$
$$\tilde{R}_3 \leftarrow e(\tilde{T}_3, g_2)^{\tilde{s}_x} \cdot e(h, w)^{-\tilde{s}_\alpha - \tilde{s}_\beta} \cdot e(h, g_2)^{-\tilde{s}_{\delta_1} - \tilde{s}_{\delta_2}} \cdot e(g_3, g_2)^{\tilde{s}_{y_i}} \cdot \left(e(\tilde{T}_3, w) / e(g_1, g_2)\right)^{\tilde{c}},$$
$$\tilde{R}_4 \leftarrow T_1^{-\tilde{s}_x} \cdot u^{-\tilde{s}_{\delta_1}},$$
$$\tilde{R}_5 \leftarrow T_2^{\tilde{s}_x} \cdot v^{-\tilde{s}_{\delta_2}}.$$

In the signer checking step (S140), the following operation is performed on the group public key gpk provided from the service providing server 120 or a certain participant, the group master secret key $gmsk = (\xi_1, \xi_2)$, the message M, and the corresponding group signature value $\tilde{\sigma} = (\tilde{T}_1, \tilde{T}_2, \tilde{T}_3, \tilde{c}, \tilde{s}_\alpha, \tilde{s}_\beta, \tilde{s}_x, \tilde{s}_y, \tilde{s}_{\delta_1}, \tilde{s}_{\delta_2})$.

1) First, it is determined whether or not the given group signature value is proper by using a group signature verification algorithm. When the given group signature value is proper, an anonymous ID $A_i \leftarrow \tilde{T}_3 \cdot (\tilde{T}_1^{-\xi_1} \cdot \tilde{T}_2^{-\xi_2})$ of the service user 100 is calculated by using $gmtk = (\xi_1, \xi_2)$.

2) The service providing server 120 checks the service user corresponding to the anonymous ID through the anonymous authentication server 110 and the anonymous ID checking server 130.

As discussed above, the anonymous service method using the general short group signature authenticates the service user and provides a service required by the user, while guaranteeing the anonymity of the service user.

However, the present invention proposes a local linkability and a novel anonymous service method capable of additionally supporting linkability within the same service domain, while maintaining anonymity according to the short group signature, by altering the anonymous service method using the short group signature based on the local linkability.

The concept of local linkability is proposed to provide a useful function such as a mileage service, or the like, by slightly lessening anonymity. In particular, it is designed to continuously provide local linkability even in a situation in which a user is repeatedly joined and seceded to thus stably provide the useful function such as the mileage service, or the like, regardless of the change in the membership.

In this respect, a service providing server using the anonymous authentication and anonymous service method may be able to link a group signature within the same domain (namely, it can check the signature generated by the same signer), but cannot check an anonymous ID of a group signer nor share "local linkability" information between service domains.

Figure 3:
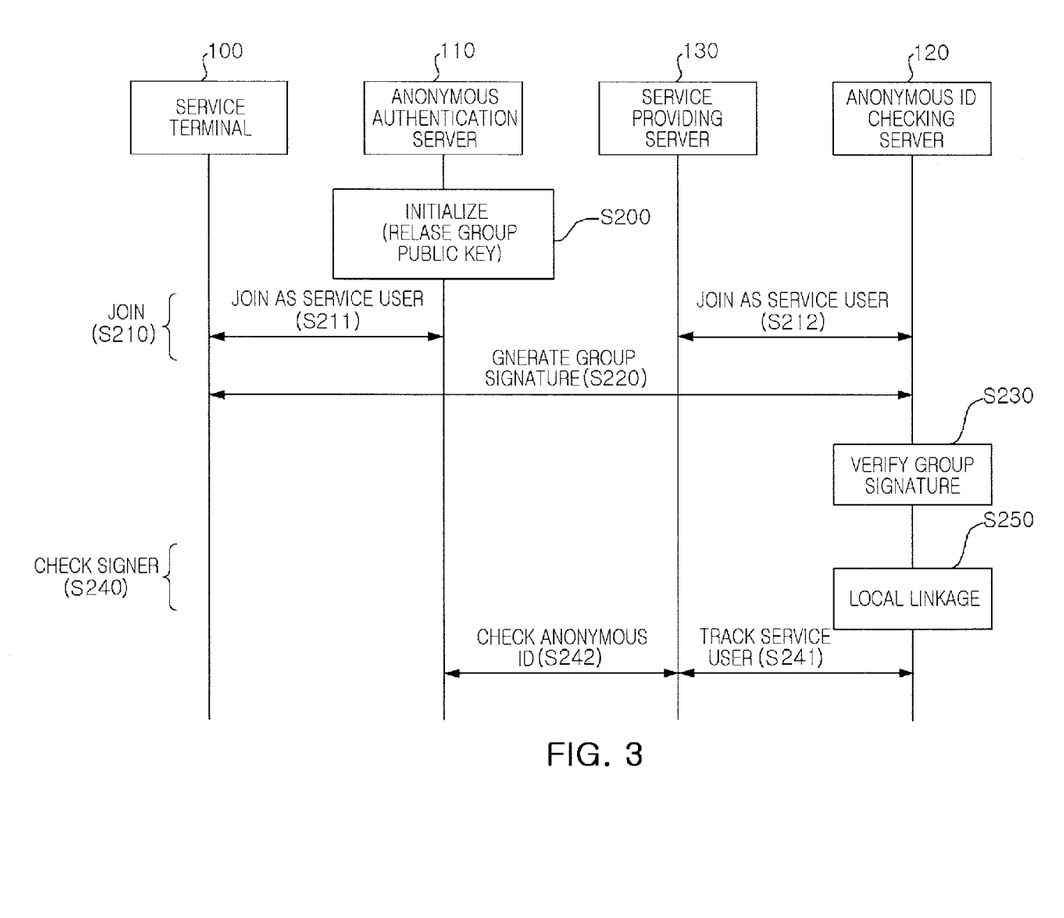
FIG. 3 is a flow chart illustrating the process of an anonymous service method providing local linkability according to an exemplary embodiment of the present invention.

FIG. 3 is a flow chart illustrating the process of an anonymous service method providing local linkability according to an exemplary embodiment of the present invention.

With reference to FIG. 3, the anonymous service method further includes a local linking step (S250) in addition to an initialization (or setup) step (S200), a joining step (S210), a group signature generation step (S220), a group signature verifying step (S230), and a signer checking (opening) step (S240).

Each process will now be described in detail.

Figure 4:
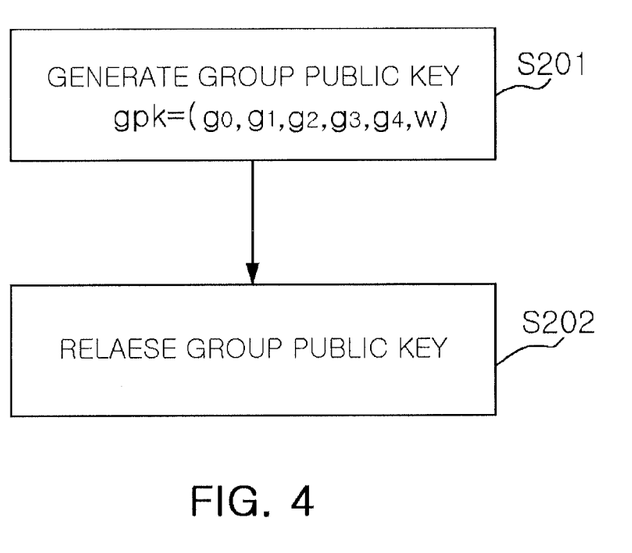
FIG. 4 is a flow chart illustrating an initialization process of FIG. 3.

First, in the initialization step (S200), as shown in FIG. 4, the anonymous authentication server 110 performs the following operation.

In step S201, the anonymous authentication server 110 receives a security parameter K and performs the following operation. First, the anonymous authentication server 110 generates a calculable isomorphism function $\phi$ coupled with a bilinear group pair $(G_1, G_2)$, a bilinear function $e: G_1 \times G_2 \rightarrow G_T$, and a hash function $H: \{0,1\}^* \rightarrow Z_P$ by using group public parameters $(e, G_1, G_2)$. Also, the anonymous authentication server 110 selects certain generation sources $g_2 \in G_2 \backslash \{1_{G_2}\}$ and $g_0, g_3, g_4, h \in G_1 \backslash \{1_{G_1}\}$, calculates $g_1 = \phi(g_2)$, selects a master secret key $\gamma \in Z^*_p$, and calculates a group public key element $w = g_2^\gamma \in G_2$ to acquire an initial group public key $gpk = (g_0, g_1, g_2, g_3, g_4, w)$.

In step S202, the anonymous authentication server 110 releases the group public key gpk to every participant. In this case, the group public key is updated whenever a revocation event occurs. Optionally, the anonymous authentication server 110 may also include $\eta_1 \leftarrow e(g_1,g_2)$, $\eta_4 \leftarrow e(g_3, g_2)$, $\eta_5 \leftarrow e(g_4, g_2)$ to the public key in order to reduce a paring function calculation of the group public key.

The joining step (S210) includes a service user joining step (S211) and a service provider joining step (S212) as shown in FIG. 3. The service user joining step (S211) is a procedure for the service user 100 who wants to join the group and use a group signature key, and the service provider joining (step S212) is a procedure for the service providing server to secure a local linkability.

In general, the service providing joining step is performed before providing the anonymous service, and re-issuance after a first issuance must be avoided as possible to ensure service continuity. The service user may perform a service user joining step any time, and it must be possible for one service user to perform the service user joining step several times to receive a group signature secret key as issued.

Figure 5:
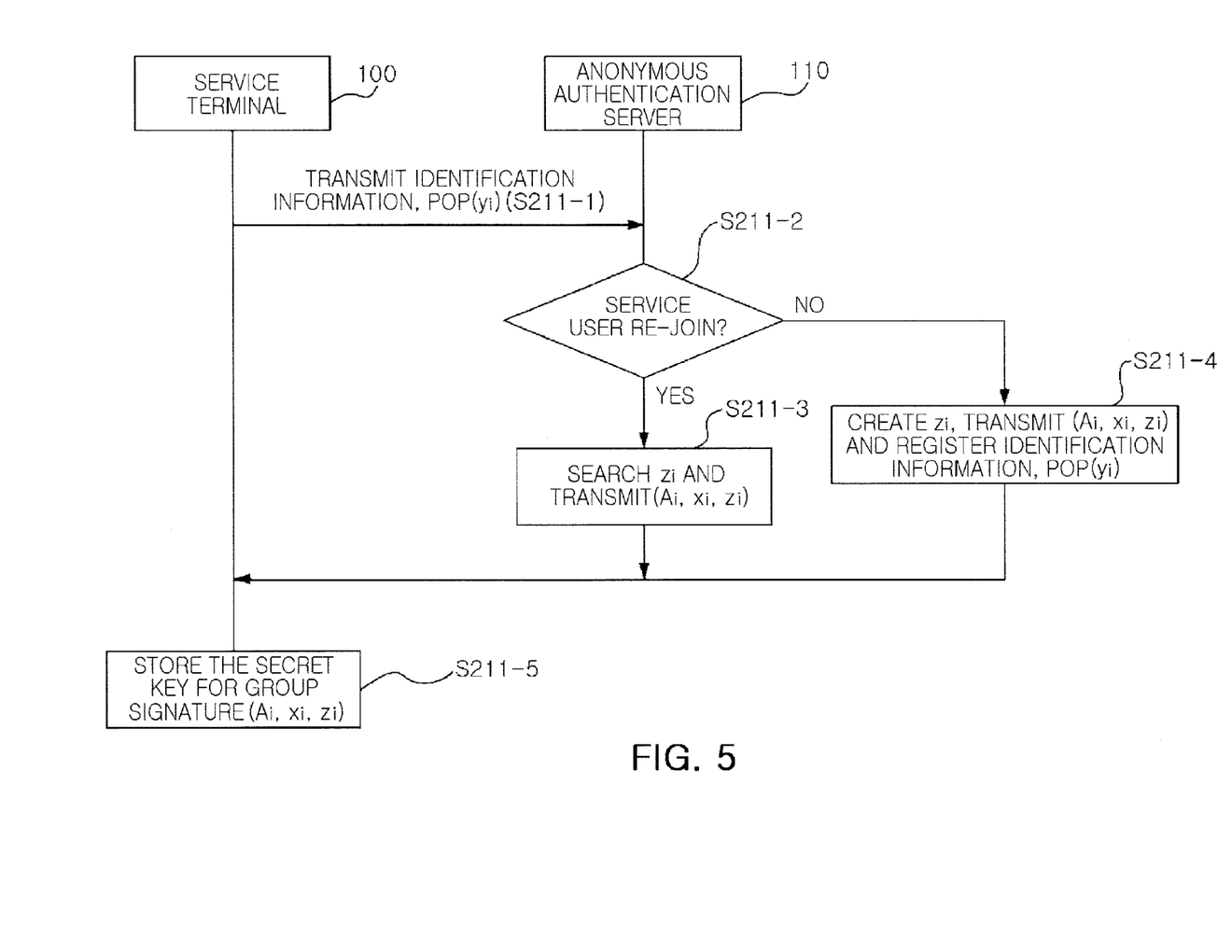
FIG. 5 is a flow chart illustrating a service user joining process of FIG. 3.

As shown in FIG. 5, the service user joining step (step S211) is performed by the service user 100 and the anonymous authentication server 110, and in this case, it is assumed that a security channel is formed between the service user 100 and the anonymous authentication server 110.

In step S211-1, the service user 100 selects his secret key $y_i \in Z_P^*$ and calculates a public key $g_3 \square G_1$. The service user 100 then generates a proof of possession (POP) of a private key with respect to the secret key $y_i$, namely, proof information POP (y0 regarding the possession of the secret key $y_i$, and transmits (identification information, POP $(y_i)$) to the anonymous authentication server 110. In this case, a value $g_2^{-y_i}$ or information allowing for a direct calculation of the value must be included in the POP $(y_i)$.

In step S211-2, the anonymous authentication server 110 receives (identification information, POP $(y_i)$) transmitted from the service user 100 who wants to join, checks whether or not it is valid, and then checks whether or not the service user 100 is re-joined.

In step S211-3, when the service user 100 has been already joined so the (identification information, POP $(y_i)$) exists in a user list, the anonymous authentication server 110 obtains $z_i$ registered for the user from the user list, selects a certain random number $x_i \in Z_P^*$, and calculates $A_i = (g_1 g_4^{-z_i} g_3^{-y_i})^{1/(\gamma+x_i)} \in G_1$. The anonymous authentication server 110 then transmits $(A_i, x_i, z_i)$ generated as a group member key with respect to the service user 100 to the corresponding service user 100.

In step S211-4, when the service user 100 is first joined and (identification information, POP $(y_i)$) is not on the user list, the anonymous authentication server 110 selects certain random numbers $x_i$, $y_i \in Z_P^*$ and calculates an anonymous ID $A_i = (g_1 g_4^{-z_i} g_3^{-y_i})^{1/(\gamma+x_i)} \in G_1$. While transmitting the group member key $(A_i, x_i, z_i)$ with respect to the service user 100 to the service user 100, the anonymous authentication server 110 adds (identification information, POP $(y_i)$, $z_i$, $g_0^{-z_i}$) to the user list to register the corresponding service user 100 (here, $g_0^{-z_i}$ is an anonymous ID fixed to a particular user, which will be denoted simply as Bi, hereinafter).

In step S211-5, the service user 100 receives $(A_i, x_i, z_i)$, checks whether or not Equation 4 shown below is established. When Equation 4 is established, the service user 100 stores gsk[i]=$(A_i, x_i, z_i, y_i)$ as his group signature secret key.

$$e(A_i, w \cdot g_2^{x_i}) = e(g_1 g_4^{-z_i} g_3^{-y_i}, g_2)(=\eta_1 \cdot \eta_5^{-z_i} \cdot \eta_4^{-y_i}) \quad \text{[Equation 4]}$$

Figure 6:
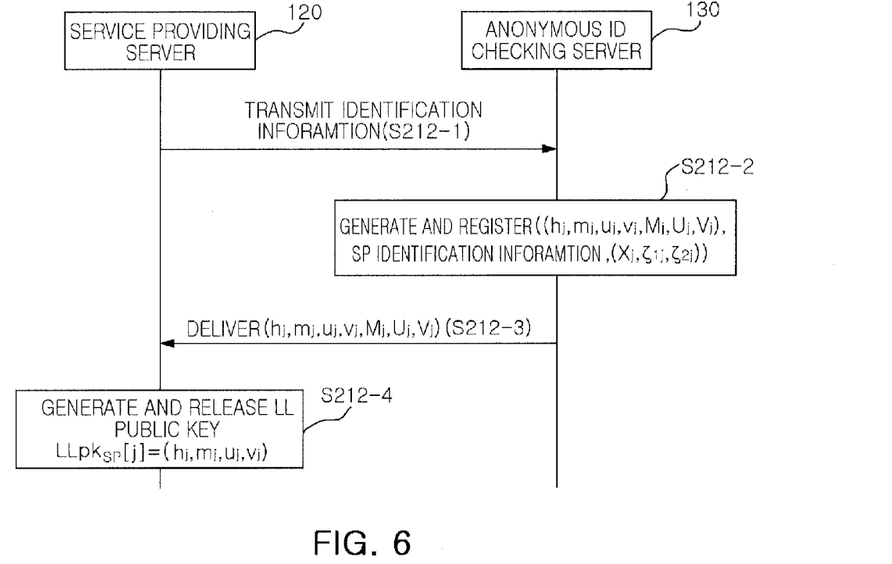
FIG. 6 is a flow chart illustrating a service provider joining process of FIG. 3.

As shown in FIG. 6, the service provider joining step (S212) is performed by the service providing server 120 and the anonymous ID checking server 130, and in this case, it is assumed that a security channel is formed between the service providing server 120 and the anonymous ID checking server 130.

In step S212-1, the service providing server 120 transmits its SP identification information to the anonymous ID checking server 130.

In step S212-2, the anonymous ID checking server 130 receives the SP identification information transmitted from the service providing server 120, checks whether or not it is valid, selects certain generation sources $m_j \square G_1 \setminus \{1_{G_1}\}$ and $M_j \in G_2 \setminus \{1_{G_1}\}$, and random numbers $\chi_j, \xi_{1j}, \xi_{2j} \in Z_P^*$, and calculates $h_j = m_j^{\chi_j}$, $u_j = m_j^{\xi_{1j}^{-1}}$, $v_j = m_j^{\xi_{2j}^{-1}} \in G_1$, $U_j = M_j^{\xi_{1j}}$, $V_j = M_j^{\xi_{2j}} \in G_2$. Then, the anonymous ID checking server 130 calculates a pair of local linking a public key and a secret key $(h_j, m_j, u_j, v_j, M_j, U_j, V_j)$, and a tracking key $tk_{sp}[j] = (\chi_j, \xi_{1j}, \xi_{2j})$ In step S212-2, the anonymous ID checking server 130 adds $((h_j, m_j, u_j, v_j, M_j, U_j, V_j)$ and SP identification information, $(\chi_j, \xi_{1j}, \xi_{2j}))$ to the service providing server list (SP-List) to register the service providing server.

In step S212-3, the anonymous ID checking server 130 delivers the pair of a public key and a secret key $(h_j, m_j, u_j, v_j, M_j, U_j, V_j)$ to the service providing server 120.

In step S212-4, the service providing server 120 receives the pair of a public key and a secret key $(h_j, m_j, u_j, v_j, M_j, U_j, V_j)$ and checks whether or not Equation 5 shown below is established. When Equation 5 is established, the service providing server 120 stores $LLsk_{sp}[j] = (M_j, U_j, V_1)$ as its LL secret key, and generates LL public key $LLpk_{sp}[j] = (h_j, m_j, u_j, v_j)$ and releases it.

$$e(m_j, M_j) = e(u_j, U_j) = e(v_j, V_j) \quad \text{[Equation 5]}$$

In this case, the service user 100 assumes that the values included in the LL public key have been issued by the anonymous ID checking server 130 for the service providing server 120, and the service user 100 may use an authentication certificate with respect to the LL public key.

Figure 7:
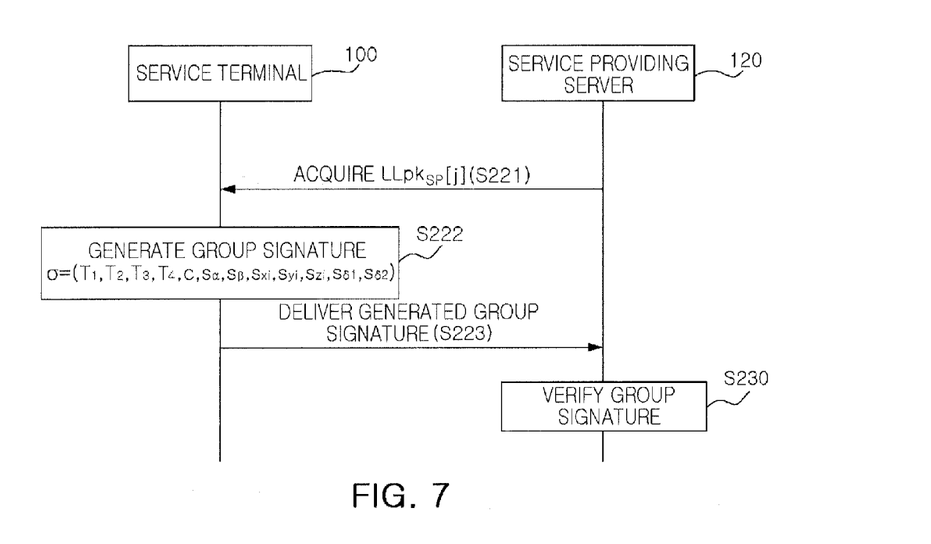
FIG. 7 is a flow chart illustrating a group signature generating process of FIG. 3.

In the group signature generation step (S220), the service user 100 generates a group signature in cooperation as shown in FIG. 7.

In step S221, the service user 100 acquires an LL public key $LLpk_{sp}[j]$ from the service providing server 120.

In step S222, the service user 100 generates a group signature by using the group public key gpk, the LL public key $LLpk_{sp}[j]$, the secret key gsk[i]=$(\hat{A}_i, x_i, z_i, y_i)$, and the message M.

Namely, the service user 100 selects certain random numbers $\alpha, \beta \in Z_P$, calculates $T_1 = u_j^\alpha$, $T_2 = v_j^\beta$, $T_3 = A_i h_j^{\alpha+\beta}$, $T_4 = g_0^{-z_i} m_j^{\alpha-\beta}$, and calculates $\delta_1 = x_i \alpha$ and $\delta_2 = x_i \beta$. And then, the service user 100 selects certain random numbers $r_\alpha, r_\beta, r_{x_i}, r_{y_i}, r_{z_i}, r_{\delta_1}, r_{\delta_2} \in Z_P$ and calculates $R_1$, $R_2$, $R_3$, $R_4$, $R_5$, $R_6$. The service user 100 calculates a hash value c=H(M,$T_1, T_2, T_3, T_4, R_1, R_2, R_3, R_4, R_5, R_6$) by using the calculated values and the message M and then calculates $s_\alpha = r_\alpha + c\alpha$, $s_\beta = r_\beta c\beta$, $s_{x_i} = r_{x_i} + cx_i$, $s_{y_i} = r_{y_i} + cy_i$, $s_{z_i} = r_{z_i} + cz_i$, $s_{\delta_1} = r_{\delta_1} + c\delta_1$, $s_{\delta_2} = r_{\delta_2} + c\delta_2$, to generate a group signature $\sigma = (T_1, T_2, T_3, T_4, c, s_\alpha, s_\beta, s_{x_i}, s_{y_i}, s_{z_i}, s_{\delta_1}, s_{\delta_2})$.

$$R_1 \leftarrow u_j^{r_\alpha}, R_2 \leftarrow v_j^{r_\beta}, \quad \text{[Equation 6]}$$
$$R_3 \leftarrow e(T_3, g_2)^{r_{x_i}} \cdot e(h_j, w)^{-r_\alpha - r_\beta} \cdot$$
$$e(h_j, g_2)^{-r_{\delta_1} - r_{\delta_2}} \cdot e(g_3, g_2)^{r_{y_i}} \cdot e(g_4, g_2)^{r_{z_i}},$$
$$R_4 \leftarrow g_0^{r_{z_i}} \cdot m_j^{-r_\alpha + r_\beta}, R_5 \leftarrow T_1^{r_{x_i}} u_j^{-r_{\delta_1}}, R_6 \leftarrow T_2^{r_{x_i}} v_j^{-r_{\delta_2}}$$

In step S223, the service user 100 delivers the group signature generated in step S222 to the service providing server 120.

In the group signature verifying step (S230), the service providing server 120 or a certain participant performs the following operation on the group public key gpk, the LL public key $LLpk_{sp}[j]$, the message M, and the group signature $\sigma=(\tilde{T}_1,\tilde{T}_2,\tilde{T}_3,\tilde{T}_4,\tilde{c},\tilde{s}_\alpha,\tilde{s}_\beta,\tilde{s}_{x_j},\tilde{s}_{y_j},\tilde{s}_{z_j},\tilde{s}_{\delta_1},\tilde{s}_{\delta_2})$ The service providing server 120 or the certain participant calculates $\tilde{R}_1, \tilde{R}_2, \tilde{R}_3, \tilde{R}_4, \tilde{R}_5, \tilde{R}_6$ according to Equation 7 shown below, generates a hash value $c=H(M,T_1, T_2, T_3, T_4, R_1, R_2, R_3, R_4, R_5, R_6)$ by using the calculated $\tilde{R}_1, \tilde{R}_2, \tilde{R}_3, \tilde{R}_4, \tilde{R}_5, \tilde{R}_6, \tilde{T}_1, \tilde{T}_2, \tilde{T}_3, \tilde{T}_4$ included in the group signature, and the message M, and then checks whether or not the hash value is identical to $\tilde{c}$ included in the group signature. When the two values are identical, the service providing server 120 or the certain participant outputs 1 (namely, the group signature is valid), or otherwise, the service providing server 120 or the certain participant outputs 0 (namely, the group signature is not valid).

$$\tilde{R}_1 \leftarrow u_j^{\tilde{s}_\alpha} \cdot \tilde{T}_1^{-\tilde{c}}, \quad \tilde{R}_2 \leftarrow v_j^{\tilde{s}_\beta} \cdot \tilde{T}_2^{-\tilde{c}}, \quad \text{[Equation 7]}$$

$$\tilde{R}_3 \leftarrow e(\tilde{T}_3, g_2)^{\tilde{s}_x} \cdot e(h_j, w)^{-\tilde{s}_\alpha - \tilde{s}_\beta} \cdot e(h_j, g_2)^{-\tilde{s}_{\delta_1}-\tilde{s}_{\delta_2}} \cdot$$

$$e(g_3, g_2)^{\tilde{s}_{y_i}} \cdot e(g_4, g_2)^{\tilde{s}_{z_i}} \cdot \left(\frac{e(\tilde{T}_3, w)}{e(g_1, g_2)}\right)^{\tilde{c}}$$

$$\tilde{R}_4 \leftarrow \tilde{T}_4^{\tilde{c}} \cdot m_j^{-\tilde{s}_\alpha + \tilde{s}_\beta} g_0^{\tilde{s}_{z_i}},$$

$$\tilde{R}_5 \leftarrow \tilde{T}_1^{-\tilde{s}_x} \cdot u_j^{-\tilde{s}_{\delta_1}}, \quad \tilde{R}_6 \leftarrow \tilde{T}_2^{-\tilde{s}_x} \cdot v_j^{-\tilde{s}_{\delta_2}}.$$

In the signer checking (opening) step (S240), the anonymous ID checking server 130 and the anonymous authentication server 110 perform the following operation.

The anonymous ID checking server 130 performs the following operation on the group public key gpk, the LL public key $LLpk_{sp}[j]$ and the tracking key $tk_{sp}[j]=(\chi_j,\xi_{1j},\xi_{2j})$ corresponding to the LL public key $LLpk_{sp}[j]$, and the message M and the group signature $\tilde{\sigma}=(\tilde{T}_1,\tilde{T}_2,\tilde{T}_3,\tilde{T}_4,\tilde{c},\tilde{s}_\alpha,\tilde{s}_\beta,\tilde{s}_{x_j},\tilde{s}_{y_j},\tilde{s},\tilde{s}_{\delta_1},\tilde{s}_{\delta_2})$ corresponding to the message M.

First, the anonymous ID checking server 130 checks whether or not the group signature is proper, and calculates an anonymous ID $B_i=g_0^{-z_i}=\tilde{T}_4 \cdot (\tilde{T}_1^{-\xi_{1j}} \tilde{T}_2^{\xi_{2j}})$ by using $tk_{sp}[j]=(\chi_j, \xi_{1j}, \xi_{2j})$. In this case, an updated anonymous ID information value $A_i=\tilde{T}_3 \cdot (\tilde{T}_1^{-\chi_j\xi_{1j}} \tilde{T}_2^{-\chi_j\xi_{2j}})$ can be also decoded by using the three $\tilde{T}_1 \leftarrow u_j^\alpha$, $\tilde{T}_2 \leftarrow v_j^\beta$, $\tilde{T}_3 \leftarrow A_i h_j^{\alpha+\beta}$ included in the group signature and the tracking key $tk_{sp}[j]=(\chi_j,\xi_{1j},\xi_{2j})$.

The anonymous authentication server 110 and the anonymous ID checking server 130 compares and searches services users having identification information corresponding to the anonymous ID and the group member key in the user list of the anonymous authentication server 110 in cooperation (if necessary) to check a user corresponding to the anonymous ID.

Figure 8:
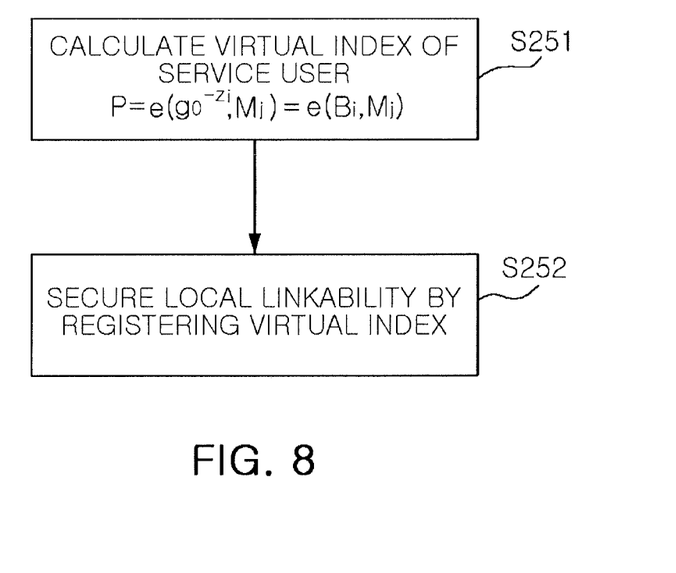
FIG. 8 is a flow chart illustrating a local linking process of FIG. 3.

In the local linking step (S250), the service providing server 120 operates to secure linkability within the same service domain as shown in FIG. 8.

In step S251, the service providing server 120 acquires the group public key, the LL public key and its LL secret key $LLsk_{sp}[j]=(M_j, U_j, V_j)$, the message M, and the group signature $\sigma=(\tilde{T}_1,\tilde{T}_2,\tilde{T}_3,\tilde{T}_4,\tilde{c},\tilde{s}_\alpha,\tilde{s}_\beta,\tilde{s}_{x_j},\tilde{s}_{y_j},\tilde{s}_{z_j},\tilde{s}_{\delta_1},\tilde{s}_{\delta_2})$ corresponding to the message M, and then checks whether or not the group signature is proper with respect to its LL public key by using a group signature verification algorithm. When the group signature is proper, the service providing server 120 calculates a virtual index of the service user 100 by using its LL secret key according to Equation 8 shown below:

$$P_{ij} \leftarrow e(\tilde{T}_4, M_j) \cdot e(\tilde{T}_2, V_j) \quad \text{[Equation 8]}$$

In step S252, the service providing server 120 acquires $P \leftarrow e(\tilde{T}_4,M_j) \cdot e(\tilde{T}_1,U_j)^{-1} \cdot e(\tilde{T}_2,V_h)=e(B_i,M_j)=e(g_1^{-z_i},M_j)$ as a virtual index and registers it to an anonymous token (AT) list to secure a local linkability.

In this manner, in the local linking step (S240), the service providing server 120 cannot calculate $A_i$ (or $x_i$, $z_i$, $b_i=g_0^{-z_i}$) corresponding to the anonymous ID of the anonymous user, but it can calculate the virtual index $P_{ij}=e(B_i,M_j)=e(g_0^{-z_i},M_j)$ having a fixed value.

Thus, the service providing server 120 can discriminate or differentiate a service user by using the virtual index having a fixed value for each service user, and perform the function of mileage service, giving a penalty, analyzing service usage records, and the like.

Namely, the service providing server 120 can support the linkability within the same service domain, while maintaining anonymity.

Notwithstanding, even when the service providers j and k collude, they cannot calculate the same virtual index from the group signatures of the same user, so they cannot check or discriminate whether users are the same.

Namely, the service providers j and k may be able to calculate only $P_{ij}=e(B_i,M_j)=e(g_0^{-z_i},M_j)$, $P_{ik}=e(B_i,M_k)=e(g_0^{-z_i},M_k)$ from the respective group signatures received from the same user, and cannot acquire the virtual index of the same value. Also, the service provider k cannot calculate the sole virtual index from group signatures of the same service user the service provider j has received, or vice versa.

Thus, in an exemplary embodiment of the present invention, because the linkability can be secured only within the same service domain while linking between different service domains is not supported, the local linkability function can be satisfied.

As set forth above, in the anonymous service method providing local linkability according to exemplary embodiments of the invention, an anonymous authentication operation based on a short group signature is performed, for which the concept of a local linkability is introduced to secure linkability within the same service domain.

Namely, in the interior of a service provider, a virtual index having a fixed value is calculated for each service user, and in this case, although a plurality of service providers collude with each other, they cannot calculate a virtual index having the same value, whereby the linkability can be secured within the same service domain but not within the interiors of different service domains.

Thus, members can be anonymously managed by using a mileage service, giving a penalty, analyzing service usage records, and the like, while maintaining the anonymity of service users.

While the present invention has been shown and described in connection with the exemplary embodiments, it will be apparent to those skilled in the art that modifications and variations can be made without departing from the spirit and scope of the invention as defined by the appended claims.

What is claimed is:

1. An anonymous service method of providing local linkability, the method comprising:
    a service user joining operation of acquiring, by a service terminal, a group signature secret key of a service user in cooperation with an anonymous authentication server;
    a service providing server joining operation of acquiring, by a service providing server, a pair of a partial linkage public key and a secret key of a service provider in cooperation with an anonymous ID checking server;
    a group signature generating operation of receiving, by the service terminal, the public key from the service providing server, and generating a group signature of the service user based on the public key and the group signature secret key;

a group signature verifying operation of verifying, by the service providing server, whether or not the group signature is valid;

a signer checking operation of calculating, by the anonymous ID checking server, an anonymous ID from the group signature, and checking the service user having the anonymous ID in cooperation with the anonymous authentication server;

a local linking operation of checking, by the service providing server, whether or not the group signature is proper through the public key and acquiring a virtual index of the service user from the group signature through the secret key in order to secure a local linkability of the service user; and a group generating operation of generating, by the anonymous authentication server, a group public key and a group member key generation secret key with a group public parameter, and releasing the group public parameter and the group public key, before the service user joining operation.

2. The method of claim 1, wherein the group generating operation comprises:

determining a bilinear group and function and a hash function as the group public parameter; and releasing the group public key based on the group public parameter, and generating and storing the group member key generation secret key.

3. The method of claim 2, wherein the service user joining operation comprises:

generating, by the service terminal, a secret key of the service user and providing information regarding POP (Proof of Possession) of a private key and identification information regarding the secret key to the anonymous authentication server;

generating, by the anonymous authentication server, the group member key including an anonymous ID corresponding to the service user and providing the same to the service terminal, and registering the service user; and generating, by the service terminal, the group signature secret key by combining the secret key and the group member key, and storing the generated group signature secret key.

4. The method of claim 3, wherein the operation of generating the group member key and providing the generated group member key to the service user comprises:

when the service user has already been registered, updating the group member key corresponding to the service user with the latest information and providing the same to the anonymous authentication server; and when the service user has not been registered, generating, by the anonymous authentication server, the group member key corresponding to the service user and providing the generated group member key to the service terminal, and registering the service user.

5. An anonymous service method of providing local linkability, the method comprising:

a service user joining operation of acquiring, by a service terminal, a group signature secret key of a service user in cooperation with an anonymous authentication server;

a service providing server joining operation of acquiring, by a service providing server, a pair of a partial linkage public key and a secret key of a service provider in cooperation with an anonymous ID checking server;

a group signature generating operation of receiving, by the service terminal, the public key from the service providing server, and generating a group signature of the service user based on the public key and the group signature secret key;

a group signature verifying operation of verifying, by the service providing server, whether or not the group signature is valid; a signer checking operation of calculating, by the anonymous ID checking server, an anonymous ID from the group signature, and checking the service user having the anonymous ID in cooperation with the anonymous authentication server;

a local linking operation of checking, by the service providing server, whether or not the group signature is proper through the public key and acquiring a virtual index of the service user from the group signature through the secret key in order to secure a local linkability of the service user; and a group generating operation of generating, by the anonymous authentication server, a group public key and a group member key generation secret key with a group public parameter, and releasing (i.e., revealing or making public) the group public parameter and the group public key, before the service user joining operation, wherein the group generating operation comprises:

determining a bilinear group and function and a hash function as the group public parameter; and releasing the group public key based on the group public parameter, and generating and storing the group member key generation secret key, wherein the service user joining operation comprises:

generating, by the service terminal, a secret key of the service user and providing information regarding POP (Proof of Possession) of a private key and identification information regarding the secret key to the anonymous authentication server;

generating, by the anonymous authentication server, the group member key including an anonymous ID corresponding to the service user and providing the same to the service terminal, and registering the service user; and generating, by the service terminal, the group signature secret key by combining the secret key and the group member key, and storing the generated group signature secret key, wherein the group member key is represented as $(A_i, x_i, z_i)(A_i=(g_1 g_4^{-z_i} g_3^{-y_i})^{1/(\gamma+x_i)} \in G_1$, $x_i, y_i, z_i \in Z_P^*, G_1, G_2$ is a bilinear group, $g_1=\phi(g_2)$, $g_2 \in G_2 \setminus \{1_{G_2}\}$, $\phi$ is an isomorphism function, $g_3, g_4 \in G_1 \setminus \{1_{G_1}\}$, $\gamma \in Z_p^*$, the group signature secret key is represented as $gsk[i]=(A_i, x_i, z_i, y_i)$, and the information regarding the POP (Proof of Possession) of the private key is generated by using $g_3 \in G_1$ and the secret key $y_i$, which is information including $g_3^{-y_i}$ as verification information indicating that it possesses the secret key $y_i$.

6. An anonymous service method of providing local linkability, the method comprising:

a service user joining operation of acquiring, by a service terminal, a group signature secret key of a service user in cooperation with an anonymous authentication server;

a service providing server joining operation of acquiring, by a service providing server, a pair of a partial linkage public key and a secret key of a service provider in cooperation with an anonymous ID checking server;

a group signature generating operation of receiving, by the service terminal, the public key from the service providing server, and generating a group signature of the service user based on the public key and the group signature secret key;

a group signature verifying operation of verifying, by the service providing server, whether or not the group signature is valid; a signer checking operation of calculating, by the anonymous ID checking server, an anonymous ID from the group signature, and checking the service user having the anonymous ID in cooperation with the anonymous authentication server;

a local linking operation of checking, by the service providing server, whether or not the group signature is proper through the public key and acquiring a virtual index of the service user from the group signature through the secret key in order to secure a local linkability of the service user; and a group generating operation of generating, by the anonymous authentication server, a group public key and a group member key generation secret key with a group public parameter, and releasing (i.e., revealing or making public) the group public parameter and the group public key, before the service user joining operation, wherein the group generating operation comprises:

determining a bilinear group and function and a hash function as the group public parameter; and releasing the group public key based on the group public parameter, and generating and storing the group member key generation secret key, wherein the service user joining operation comprises:

generating, by the service terminal, a secret key of the service user and providing information regarding POP (Proof of Possession) of a private key and identification information regarding the secret key to the anonymous authentication server;

generating, by the anonymous authentication server, the group member key including an anonymous ID corresponding to the service user and providing the same to the service terminal, and registering the service user; and generating, by the service terminal, the group signature secret key by combining the secret key and the group member key, and storing the generated group signature secret key, wherein the service providing server joining operation comprises:

providing, by the service providing server, identification information of the service provider to the anonymous ID checking server;

generating, by the anonymous ID checking server, a pair of a public key and a secret key and a tracking key to register the service provider, and providing the pair of a public key and a secret key to the service providing server; and generating, by the service providing server, an LL public key and an LL secret key from the pair of public key and secret key, and storing the same.

7. The method of claim 6, wherein the public key is represented as $LLpk_{sp}[j]=(h_j,m_j,u_j,v_j)(h_j=m_j^{\chi_j}, u_j=m_j^{\xi_{1j}^{-1}}, v_j=m_j^{\xi_{2j}^{-1}} \in G_1, m_{j \in G1} \setminus \{1_{G_1}\}, X_j, \xi_{1j}, \xi_{2j} \in Z_P^*)$, the secret key is represented as $LLsk_{sp}[j]=(M_j,U_j,V_j)(M_j \in G_2 \setminus \{1_{G_1}, U_j=M_j^{\xi_{1j}}, V_j=M_j^{\xi_{2j}} \in G_2)$, and the tracking key is represented as $(tk_{sp}[j]=(X_j, \xi_{1j}, \xi_{2j} \in Z_P^*)$.

8. The method of claim 7, wherein the generating and storing of the LL public key and the LL secret key comprises:

generating, by the service providing server, the LL public key from the public key by using a group public parameter of a current session, and storing the LL public key; and storing, by the service providing server, the secret key as the LL secret key.

9. The method of claim 8, wherein the group public parameter is represented as (e, $G_1$, $G_2$, H)(H:$\{0,1\}^* \rightarrow Z_P$, H is a hash function), the group public key is represented as (gpk=($g_0,g_1,g_2,g_3,g_4$,w)), and the LL public key is represented as ($LLpk_{sp}[j]=(h_j,h_j,u_j,v_j)$).

10. The method of claim 8, wherein the generating and storing of the LL public key and the LL secret key further comprises, before generating and storing the LL public key and storing the secret key as the LL secret key:

checking, by the service providing server, whether or not the pair of public key and the secret key satisfies a formula of $e(m_j,M_j)=e(u_j,U_j)=e(v_j,V_j)$.

11. The method of claim 6, wherein the group signature generating operation comprises:

acquiring, by the service terminal, the LL public key of the service provider from the service providing server; and generating, by the service terminal, the group signature by using the LL public key, the group signature secret key, and a message.

12. The method of claim 11, wherein the group signature is represented as $(\sigma=(T_1,T_2,T_3,T_4,c,s_\beta,s_\beta,s_{x_i},s_{y_i},s_{z_i},s_{\delta_1},s_{\delta_2})$ $(T_1=u_j^\alpha, T_2=v_j^\beta, T_3=A_i h_j^{\alpha+\beta}, T_4=g_0^{-z_i} m_j^{\alpha-\beta}, \alpha, \beta \in Z_P, H=\{0,1\}^* \in Z_P$, H is a hash function, c=H(M,$T_1,T_2,T_3,T_4,R_1,R_2,R_3,R_4,R_5,R_6$), M is a message, $R_1 \leftarrow u_j^{r_\alpha}, R_2 \leftarrow v_j^{r_\beta}$, $R_3 \leftarrow e(T_3, g_2)^{r_{x_i}} \cdot e(h_j, w)^{-r_\alpha - r_\beta} \cdot$ $e(h_j, g_2)^{-r_{\delta_1} - r_{\delta_2}} \cdot e(g_3, g_2)^{r_{y_i}} \cdot e(g_4, g_2)^{r_{z_i}},$ $R_4 \leftarrow g_0^{r_{z_i}} \cdot m_j^{-r_\alpha + r_\beta}, R_5 \leftarrow T_1^{r_{x_i}} u_j^{-r_{\delta_1}}, R_6 \leftarrow T_2^{r_{x_i}} v_j^{-r_{\delta_2}},$ $h_j = m_j^{\chi_j}, m_j \in G_1 \setminus \{1_{G_1}\},$ $\chi_j \in Z_p^*, w = g_2^\gamma \in G_2,$ $\gamma \in Z_p^*, \delta_1 = x_i a, \delta_2 = x_i \beta, s_\alpha = r_\alpha + c\alpha,$ $s_\beta = r_\beta + c\beta,$ $s_{x_i} = r_{x_i} + cx_i, s_{y_i} = r_{y_i} + cy_i, s_{z_i} = r_{z_i} + cz_i,$ $s_{\delta_1} = r_{\delta_1} + c\delta_1, s_{\delta_2} = r_{\delta_2} + c\delta_2).$ 13. The method of claim 6, wherein the signer checking operation comprises:

extracting, by the anonymous ID checking server, an anonymous ID of the service user from the group signature by using the tracking key; and checking, by the anonymous ID checking server, a service user having the identification information corresponding to the extracted anonymous ID and the group member key in cooperation with the anonymous authentication server.

14. The method of claim 13, wherein the anonymous ID is represented as $(B_i=g_0^{-z_i}=\tilde{T}_4 \cdot (\tilde{T}_1^{-\xi_{1j}} \tilde{T}_2^{\xi_{2j}}))(T_4 \leftarrow g_0^{-z_i} m_j^{\alpha-\beta}, T_1 \leftarrow u_j^\alpha, T_2 \leftarrow v_j^\beta).$ 15. The method of claim 6, wherein the local linking operation comprises:

checking, by the service providing server, whether or not the group signature is proper; and acquiring a virtual index of the service user from the group signature through the LL secret key to secure a local linkability.

16. The method of claim 14, wherein the virtual index of the service user is represented as $(P_{ij} \leftarrow e(\tilde{T}_4,M_j) \cdot e(\tilde{T}_1,U_j)^{-1} \cdot e(\tilde{T}_2,V_j)=e(B_i,M_j)=e(g_0^{-z_i},M_j)).$

* * * * *